United States Patent
Kortovich et al.

(10) Patent No.: US 7,544,316 B2
(45) Date of Patent: Jun. 9, 2009

(54) PROCESS FOR MAKING GRAPHITE ARTICLES

(75) Inventors: James William Kortovich, Strongsville, OH (US); Richard Liichang Shao, North Royalton, OH (US); Irwin Charles Lewis, Strongsville, OH (US); Richard Thomas Lewis, Auburn, OH (US); Dai Huang, Sagamore Hills, OH (US)

(73) Assignee: GrafTech International Holdings Inc., Parma, OH (US)

( * ) Notice: Subject to any disclaimer, the term of this patent is extended or adjusted under 35 U.S.C. 154(b) by 678 days.

(21) Appl. No.: 11/148,155

(22) Filed: Jun. 8, 2005

(65) Prior Publication Data

US 2006/0192311 A1 Aug. 31, 2006

Related U.S. Application Data

(63) Continuation-in-part of application No. 10/649,359, filed on Aug. 27, 2003, now Pat. No. 6,916,435.

(51) Int. Cl.
B29C 47/78 (2006.01)
C01B 31/04 (2006.01)

(52) U.S. Cl. .............. 264/29.1; 264/29.5; 264/29.7; 264/105; 264/211.11; 264/211.12; 264/211.17

(58) Field of Classification Search .............. None
See application file for complete search history.

(56) References Cited

U.S. PATENT DOCUMENTS

| 4,005,183 | A | | 1/1977 | Singer ............... 423/447.2 |
| 4,017,327 | A | | 4/1977 | Lewis et al. ............ 106/273 |
| 4,891,203 | A | * | 1/1990 | Singer et al. ........... 423/449.9 |
| 4,998,709 | A | | 3/1991 | Griffin et al. ............ 264/29.5 |
| 5,158,828 | A | * | 10/1992 | Sudani et al. ............ 428/368 |
| 6,280,663 | B1 | | 8/2001 | Shao et al. ............ 264/29.7 |

OTHER PUBLICATIONS

British Patent No. 1,526,809; Application No. 39441/75, filed Sep. 26, 1975; Process for Producing Graphite Bodies.
Dan D. Edie and John J. McHugh "High Performance Carbon Fibers," pp. 119-139 of *Carbon Materials for Advanced Technologies*, 1st Ed., Elsevier Science Ltd. 1999.

* cited by examiner

*Primary Examiner*—Edmund H. Lee
(74) *Attorney, Agent, or Firm*—Waddey & Patterson, PC; James R Cartiglia

(57) ABSTRACT

A process for preparing graphite articles is presented. In particular, the process includes employing a particulate fraction comprising at least about 35 weight percent coke, coal or combinations thereof having a diameter such that a major fraction of it passes through a 0.25 mm to 25 mm mesh screen. The particulate fraction is mixed with a liquid or solid pitch binder, to form a stock blend; the stock blend is extruded to form a green stock; the green stock is baked to form a carbonized stock; and the carbonized stock is graphitized. The stock blend further includes carbon fibers added after mixing of the particulate fraction and pitch has begun.

13 Claims, No Drawings

PROCESS FOR MAKING GRAPHITE ARTICLES

RELATED APPLICATION

This application is a continuation-in-part of and commonly assigned U.S. patent application Ser. No. 10/649,359, filed in the name of Kortovich, Shao, Huang, Lewis and Lewis on Aug. 27, 2003 now U.S. Pat. No. 6,916,435, entitled "Process of Making Graphite Articles," the disclosure of which is hereby incorporated by reference herein.

BACKGROUND OF THE INVENTION

1. Technical Field

The present invention relates to graphite articles, and a process for preparing the inventive graphite articles. More particularly, the invention concerns articles such as graphite electrodes or cathodes formed by processing a blend of (i) a particulate fraction comprising at least about 35 weight percent calcined coke and (ii) pitch, where the blend further includes small particle size filler, carbon fibers, or combinations thereof.

2. Background Art

Graphite electrodes are used in the steel industry to melt the metals and other ingredients used to form steel in electrothermal furnaces. The heat needed to melt metals is generated by passing current through a plurality of electrodes, usually three, and forming an arc between the electrodes and the metal. Electrical currents in excess of 100,000 amperes are often used. The resulting high temperature melts the metals and other ingredients. Generally, the electrodes used in steel furnaces each consist of electrode columns, that is, a series of individual electrodes joined to form a single column. In this way, as electrodes are depleted during the thermal process, replacement electrodes can be joined to the column to maintain the length of the column extending into the furnace.

Generally, electrodes are joined into columns via a pin (sometimes referred to as a nipple) that functions to join the ends of adjoining electrodes. Typically, the pin takes the form of opposed male threaded sections, with at least one end of the electrodes comprising female threaded sections capable of mating with the male threaded section of the pin. Thus, when each of the opposing male threaded sections of a pin are threaded into female threaded sections in the ends of two electrodes, those electrodes become joined into an electrode column. Commonly, the joined ends of the adjoining electrodes, and the pin there between, are referred to in the art as a joint.

Given the extreme thermal stress that the electrode and the joint (and indeed the electrode column as a whole) undergoes, mechanical/thermal factors such as strength, thermal expansion, and crack resistance must be carefully balanced to avoid damage or destruction of the electrode column or individual electrodes. For instance, longitudinal (i.e., along the length of the electrode/electrode column) thermal expansion of the electrodes, especially at a rate different than that of the pin, can force the joint apart, reducing effectiveness of the electrode column in conducting the electrical current. A certain amount of transverse (i.e., across the diameter of the electrode/electrode column) thermal expansion of the electrode in excess of that of the pin may be desirable to form a firm connection between pin and electrode; however, if the transverse thermal expansion of the electrode greatly exceeds that of the pin, damage to the electrode or separation of the joint may result. Again, this can result in reduced effectiveness of the electrode column, or even destruction of the column if the damage is so severe that the electrode column fails at the joint section. Thus, control of the thermal expansion of an electrode, in both the longitudinal and transverse directions, is of paramount importance.

As a consequence, if the pin can be eliminated from the electrode/electrode column system, the need to balance the thermal expansion of the different system components (i.e., pin and electrode) is reduced. Prior attempts to eliminate the pin have been attempted, where a threaded electrode end or other electrode mating means have been employed. Industry acceptance has lagged, however, since it is felt that the strength of the graphite is not sufficient to maintain the integrity of the electrode column without a pin. Regardless of whether the pin is eliminated or not, increased graphite electrode strength and toughness (which can be defined as resistance to cracking) and reduction of brittleness (which can be defined as the rate of propagation of cracks) is desired in order to extend electrode life.

Similarly, in the case of graphite cathodes (utilized in the aluminum smelting industry) and other synthetic graphite artifacts, increased strength and toughness will result in longer life and improved usability.

There have been references to the use of mesophase pitch-based carbon fibers to improve specific properties of bulk graphite products such as electrodes. For instance, Singer, in U.S. Pat. No. 4,005,183, describes the production of mesophase pitch-based fibers and states that, because of their low electrical resistivity, these fibers can be employed as filler material in the production of graphite electrodes. In British Patent 1,526,809 to Lewis and Singer, 50% to 80% by weight of carbon fibers are added to 20% to 50% by weight of pitch binder and then extruded to form a carbon artifact that can be graphitized. The resulting article exhibits relatively low longitudinal thermal expansion.

In U.S. Pat. No. 4,998,709, Griffin et al. attempt to address the problems caused by excessive longitudinal thermal expansion of electrode pins by preparing a graphite nipple (i.e., pin) with mesophase pitch-based carbon fibers included in the extrusion blend. The carbon fibers used by Griffin et al. have a Young's modulus of greater than $55\times10^6$ pound-forces per square inch (psi), and are present in the blend at about 8 to 20 weight percent. The blend is extruded, baked, and then graphitized for from about 5 to 14 days to produce the nipple. Although nipples produced by the Griffin et al. process show a decrease in the coefficient of thermal expansion (CTE) in the longitudinal direction, they also show an undesirable increase in CTE in the transverse direction, an increase in electrical resistivity and a decrease in the modulus of rupture. In addition, the graphitizing time is extremely long compared with times that would be advantageous for commercial production.

In an improved process for preparing connecting pins containing fibers, Shao et al. teach the inclusion of carbon fibers derived from mesophase pitch in the calcined coke/pitch blend, in U.S. Pat. No. 6,280,663. The resulting pins exhibit reduced longitudinal CTE without requiring commercially disadvantageous graphitizing time. However, even such improved pins as produced by the Shao et al. process do not eliminate the need for electrodes with improved strength; additionally, if pins could be eliminated altogether, the savings and efficiency gains would be extremely beneficial.

What is desired, therefore, is a graphite article having reduced CTE in the longitudinal direction as compared with art-conventional graphite articles, without sacrificing transverse CTE or resistivity and modulus of rupture. Moreover, graphite articles having increased strength and toughness, especially increased strength and toughness sufficient to permit mating of electrodes without the use of a pin, are also desired. It is also highly desirable to achieve these property benefits without using high quantities of expensive materials.

SUMMARY OF THE INVENTION

It is an aspect of the present invention to provide a process for preparing graphite articles.

It is another aspect of the present invention to provide a process for preparing graphite articles, such as graphite electrodes or graphite cathodes, having reduced longitudinal coefficient of thermal expansion and improved resistance to cracking and fracture as compared to art-conventional graphite articles.

It is yet another aspect of the present invention to provide a process for preparing graphite articles, the articles having reduced longitudinal coefficient of thermal expansion as compared to art-conventional articles, without substantial sacrifice of transverse CTE or resistivity while also increasing the modulus of rupture.

Still another aspect of the present invention is a graphite article, such as a graphite electrode or graphite cathode, having reduced longitudinal coefficient of thermal expansion and improved resistance to cracking and fracture as compared to art-conventional graphite articles especially without substantial sacrifice of transverse CTE or resistivity while also increasing the modulus of rupture.

These aspects and others that will become apparent to the artisan upon review of the following description can be accomplished by providing a process for preparing graphite articles, the process including employing a particulate fraction comprising at least about 35 weight percent, and more preferably at least about 50 weight percent, most preferably at least about 70 weight percent, coke, coal or combinations thereof having a diameter such that a major fraction of it passes through a 0.25 mm to 25 mm mesh screen. Calcined coke is most commonly employed in the particulate fraction. The particulate fraction is mixed with a liquid or solid pitch binder, to form a stock blend; the stock blend is extruded to form a green stock; the green stock is baked to form a carbonized stock; and the carbonized stock is graphitized by heating it to a temperature of at least about 2500° C. and maintaining it at that temperature for a suitable time. The stock blend further comprises carbon fibers added after mixing of the particulate fraction and pitch has begun and, optionally, small particle size filler (advantageously added as part of the particulate fraction).

In the inventive process, the carbon fibers are preferably present at a level of about 0.5 to about 6 parts by weight of carbon fibers per 100 parts by weight of calcined coke, or at about 0.4% to about 5.5% by weight of the total mix components (excluding binder). The preferred fibers have an average diameter of about 6 to about 15 microns, and a length of preferably about 4 mm to about 25 mm, and most preferably less than about 32 mm. The carbon fibers used in the inventive process should preferably have a tensile strength of at least about 150,000 psi. Most advantageously, the carbon fibers are added to the stock blend as bundles, each bundle containing from about 2000 to about 20,000 fibers.

As noted above, the fibers are added after mixing of the particulate fraction and pitch has already begun. Adding the fibers after the mixing has begun will help preserve fiber length (which can be reduced during the mixing process) and thereby the beneficial effects of the inclusion of fibers, which are believed to be related to fiber length. In order to achieve a beneficial result, the fibers should preferably be added after at least about 15% of the mix cycle has been completed, more preferably after at least about 30% of the mix cycle has been completed. Indeed, in a more preferred embodiment, the fibers are added after at least about half the mix cycle has been completed, most advantageously after at least about three-quarters of the mix cycle has been completed. For instance, if the mixing of the particulate fraction and pitch takes two hours (i.e., a mix cycle is two hours), the fibers should be added after at least about 18 minutes of mixing (or 15% of the two hour mix cycle).

As noted above, the particulate fraction can include small particle size filler (small is used herein as compared to the particle size of the calcined coke, which generally has a diameter such that a major fraction of it passes through a 25 mm mesh screen but not a 0.25 mm mesh screen, and as compared to the fillers conventionally employed). More specifically, the small particle size filler comprises at least about 75% coke powder, by which is meant coke having a diameter such that at least about 70% and more advantageously up to about 90%, will pass through a 200 Tyler mesh screen, equivalent to 74 microns.

The small particle size filler can further comprise at least about 0.5% and up to about 25% of other additives like a puffing inhibitor such as iron oxide. Again, the additive should also be employed at a particle size smaller than that conventionally used. For instance, when iron oxide is included, the average diameter of the iron oxide particles should be such that they are smaller than about 10 microns. Another additional additive which can be employed is petroleum coke powder, having an average diameter such that they are smaller than about 10 microns, added to fill porosity of the article and thus enable better control of the amount of pitch binder used. The small particle size filler should comprise at least about 30%, and as high as about 50% or even 65% of the particulate fraction.

The baking of the green stock preferably takes place at a temperature of up to about 700 to about 1000° C. in a nonoxidizing or reducing environment, and graphitization is preferably at a temperature of from about 2500 to about 3400° C.

DETAILED DESCRIPTION OF THE PREFERRED EMBODIMENT

As noted above, graphite articles (graphite articles is used herein to include at least graphite electrodes, pins for graphite electrodes, and cathodes) can be fabricated by first combining a particulate fraction comprising calcined coke (when the graphite article to be produced is a graphite electrode), pitch and mesophase pitch or PAN-based carbon fibers into an stock blend. More specifically, crushed, sized and milled calcined petroleum coke is mixed with a coal-tar pitch binder to form the blend. The particle size of the calcined coke is selected according to the end use of the article, and is within the skill in the art. Generally, in graphite electrodes for use in processing steel, particles up to about 25 millimeters (mm) in average diameter are employed in the blend. The particulate fraction preferable includes a small particle size filler comprising coke powder. Other additives that may be incorporated into the small particle size filler include iron oxides to inhibit puffing (caused by release of sulfur from its bond with carbon inside the coke particles), coke powder and oils or other lubricants to facilitate extrusion of the blend.

The particulate fraction can comprise other than calcined coke as the "large" particle fraction. For instance, when the article is a graphite (by which term is included semi-graphitic) cathode, the coke employed can be calcined coke, or petroleum coke, coal derived coke, and combinations of these cokes. The manufacture of the cathode may also include calcined anthracite coal instead of the coke or along with the coke.

Also included in the blend are mesophase pitch-based carbon fibers or fibers derived from PAN (polyacrylonitrile), added after mixing of the stock has already begun. Graphitized fibers can also be employed. The fibers used should advantageously have a Young's modulus (after carbonization) of about $15 \times 10^6$ psi to about $40 \times 10^6$ psi. They preferably have an average diameter of about 6 to about 15 microns, a tensile strength of about $200 \times 10^3$ psi to about $400 \times 10^3$ psi, and are preferably about 4 mm to about 32 mm in length on average. Suitable lengths of fiber include an average length of about 6 mm or less, about 12 mm or less, about 18 mm or less, or about 25 mm or less. It is also preferred that the carbon fibers are not longer than the biggest coke particle. Most advantageously, the fibers are added to the blend as bundles containing between about 2000 and about 20,000 fibers per bundle, compacted with the use of a sizing.

As noted, the carbon fibers to be included in the blend are based on mesophase pitch or PAN. Mesophase pitch fibers are produced from pitch that has been at least partially transformed to a liquid crystal, or so-called mesophase, state. Mesophase pitch can be prepared from feedstocks such as heavy aromatic petroleum streams, ethylene cracker tars, coal derivatives, petroleum thermal tars, fluid cracker residues and pressure treated aromatic distillates having a boiling range from 340° C. to about 525° C. The production of mesophase pitch is described in, for example, U.S. Pat. No. 4,017,327 to Lewis et al., the disclosure of which is incorporated herein by reference. Typically, mesophase pitch is formed by heating the feedstock in a chemically inert atmosphere (such as nitrogen, argon, helium or the like) to a temperature of about 350° C. to 500° C. A chemically inert gas can be bubbled through the feedstock during heating to facilitate the formation of mesophase pitch. For preparation of carbon fibers, the mesophase pitch should have a softening point, that is, the point at which the mesophase pitch begins to deform, of less than about 400° C. and usually less than about 350° C. If the pitch has a higher softening point, formation of carbon fibers having the desired physical properties is difficult.

Once the mesophase pitch is prepared, it is spun into filaments of the desired diameter, by known processes such as by melt spinning, centrifugal spinning, blow spinning or other processes which will be familiar to the skilled artisan. Spinning produces carbon fibers suitable for use in preparing the electrode of the present invention. The filaments are then thermoset at a temperature no higher than the softening point of the pitch (but usually above 250° C.) for about 5 to 60 minutes, then further treated at extremely high temperatures, on the order of up to about 1000° C. and higher, and in some cases as high as about 3000° C., more typically about 1500° C. to 1700° C., to carbonize the fibers. The carbonization process takes place in an inert atmosphere, such as argon gas, for at least about 0.5 minutes. Most commonly, carbonization uses residence times of between about 1 and 25 minutes. The fibers are then cut to length and formed into bundles. Such fibers, bundled as described, are commercially available from, for instance, Cytec Industries Inc. of West Paterson, N.J. and Mitsubishi Chemical Functional Products Inc. of Tokyo, Japan.

One method of making the PAN fibers comprises spinning the fibers from a solution of polyacrylonitrile. The fibers are then stabilized in the same manner as are the mesophase pitch-based fibers. The production of PAN fibers is described, for instance, by Dan D. Edie and John J. McHugh in "High Performance Carbon Fibers" at pages 119-138 of *Carbon Materials for Advanced Technologies,* 1st Ed., Elsevier Science Ltd. 1999, the disclosure of which is incorporated herein by reference.

The carbon fibers are preferably included in the stock blend at a level of about 0.5 to about 6 parts by weight of carbon fibers per 100 parts by weight of calcined coke. Most preferably, the fibers are present at a level of about 1.25 to about 6 parts by weight fibers per 100 parts by weight of coke. In terms of the blend as a whole (excluding binder), the carbon fibers are incorporated at a level of about 1% to about 5.5% by weight, more preferably about 1.5% to up to about 5.5%, even more preferably, about 5.0% or less.

After the blend of particulate fraction, pitch binder, carbon fibers, etc. is prepared, the body is formed (or shaped) by extrusion though a die or molded in conventional forming molds to form what is referred to as a green stock. The forming, whether through extrusion or molding, is conducted at a temperature close to the softening point of the pitch, usually about 100° C. or higher. Although the die or mold can form the article in substantially final form and size, machining of the finished article is usually needed, at the very least to provide structure such as threads. The size of the green stock can vary; for electrodes the diameter can vary between about 220 mm and 700 mm. With respect to cathodes, a rectangular cross-section may be employed.

After extrusion, the green stock is heat treated by baking at a temperature of between about 700° C. and about 1100° C., more preferably between about 800° C. and about 1000° C., to carbonize the pitch binder to solid pitch coke, to give the article permanency of form, high mechanical strength, good thermal conductivity, and comparatively low electrical resistance, and thus form a carbonized stock. The green stock is baked in the relative absence of air to avoid oxidation. Baking should be carried out at a rate of about 1° C. to about 5° C. rise per hour to the final temperature. After baking, the carbonized stock may be impregnated one or more times with coal tar or petroleum pitch, or other types of pitches or resins known in the industry, to deposit additional coke in any open pores of the stock. Each impregnation is then followed by an additional baking step.

After baking, the carbonized stock, is then graphitized. Graphitization is by heat treatment at a final temperature of between about 2500° C. to about 3400° C. for a time sufficient to cause the carbon atoms in the coke and pitch coke binder to transform from a poorly ordered state into the crystalline structure of graphite. Advantageously, graphitization is performed by maintaining the carbonized stock at a temperature of at least about 2700° C., and more advantageously at a temperature of between about 2700° C. and about 3200° C. At these high temperatures, elements other than carbon are volatilized and escape as vapors. The time required for maintenance at the graphitization temperature using the process of the present invention is no more than about 18 hours, indeed, no more than about 12 hours. Preferably, graphitization is for about 1.5 to about 8 hours.

As noted, once graphitization is completed, the finished article can be cut to size and then machined or otherwise formed into its final configuration. The articles prepared in accordance with the present invention exhibit a substantial reduction in longitudinal CTE as compared with articles prepared by conventionally process. The articles an increase in flexural strength (i.e., modulus of rupture) and an increase in Young's modulus, without a concomitant significant increase in transverse CTE or specific resistance, without the requirement of commercially disadvantageous graphitization times. In addition, an increased resistance to cracking or fracture as indicated by decreased brittleness and increased toughness is also observed.

The following examples are presented to further illustrate and explain the present invention and should not be viewed as limiting in any regard. Unless otherwise indicated, all parts and percentages are by weight, and are based on the weight of the product at the particular stage in processing indicated.

EXAMPLE 1

A graphite electrode trial was conducted with additions of fibers from Mitsubishi Chemical (mesophase pitch fibers, 18 mm long chopped bundles), Cytec (mesophase pitch fibers, 6 mm and 25 mm long chopped bundles), and Zoltek (PAN based fibers, 25 mm long chopped bundles). The concentration of the fiber bundles in the mix (excluding binder) was between about 2.5 to about 5 weight percent. The stocks were prepared in a paddle arm, cylinder mixer, cooled, and extruded to about 150 mm×about 330 mm long electrodes. The electrodes were processed as described above. The physical properties of the electrodes with fibers are compared to those of control electrodes (no fibers) below.

TABLE I

Properties of Cylinder Mixed Electrodes With Fiber Additions

|  | Density ($g/cm^3$) | Resistance ($\mu\Omega m$) | Modulus ($psi \times 10^6$) | Flex Str (psi) | Long CTE ($1/°C. \times 10^{-6}$) | Trans CTE ($1/°C. \times 10^{-6}$) |
| --- | --- | --- | --- | --- | --- | --- |
| Without fibers | 1.692 | 5.52 | 1.41 | 1511 | 0.29 | 1.36 |
| Mitsubishi, 18 mm, 2.5% | 1.689 | 5.57 | 1.57 | 1700 | 0.18 | 1.38 |
| Mitsubishi, 18 mm, 5% | 1.693 | 5.45 | 1.73 | 1907 | 0.07 | 1.45 |
| Cytec, 6 mm, 2% | 1.705 | 5.79 | 1.56 | 1652 | 0.21 | 1.41 |
| Cytec, 6 mm, 4% | 1.710 | 5.52 | 1.78 | 1926 | 0.12 | 1.43 |
| Cytec, 25 mm, 2.5% | 1.686 | 5.56 | 1.54 | 1715 | 0.18 | 1.39 |
| Zoltek, 25 mm, 2% | 1.710 | 5.60 | 1.53 | 1574 | 0.19 | 1.47 |

EXAMPLE 2

A second graphite electrode trial was conducted with additions of fibers from Mitsubishi Chemical (mesophase pitch fibers, 30 mm long chopped bundles), Zoltek (PAN based fibers, 51 mm long chopped bundles), Cytec (mesophase pitch fibers, 6 mm and 25 mm long chopped bundles), and ConocoPhillips (mesophase pitch fibers, 25 mm long chopped mat). Addition levels of the fiber bundles was about 1.5 and about 3 weight percent. The stocks were prepared in a double arm, Sigma blade mixer, cooled, and extruded to about 150 mm×about 330 mm long electrodes. The electrodes were processed as described above. The physical properties of the electrodes with fibers are compared to those of control electrodes (no fibers) below.

TABLE II

Properties of Sigma Mixed Electrodes With Fiber Additions

|  | Density (g/cm³) | Resistance (μΩm) | Modulus (psi × 10⁶) | Flex Str (psi) | Long CTE (1/° C. × 10⁻⁶) | Trans CTE (1/° C. × 10⁻⁶) |
|---|---|---|---|---|---|---|
| Without Fibers | 1.658 | 5.98 | 1.18 | 1340 | 0.40 | 1.32 |
| Mitsubishi, 30 mm, 1.5% | 1.656 | 5.87 | 1.40 | 1515 | 0.21 | 1.25 |
| Mitsubishi, 30 mm, 3% | 1.625 | 5.94 | 1.40 | 1624 | 0.08 | 1.15 |
| Zoltek, 51 mm, 1.5% | 1.654 | 5.97 | 1.40 | 1686 | 0.26 | 1.29 |
| Zoltek, 51 mm, 3% | 1.634 | 5.85 | 1.42 | 1756 | 0.16 | 1.20 |
| Cytec, 6 mm, 1.5% | 1.641 | 6.12 | 1.33 | 1531 | 0.23 | 1.18 |
| Cytec, 6 mm, 3% | 1.611 | 6.01 | 1.38 | 1667 | 0.11 | 1.17 |
| Cytec, 25 mm, 1.5% | 1.627 | 6.27 | 1.23 | 1488 | 0.23 | 1.22 |
| Cytec, 25 mm, 3% | 1.624 | 6.00 | 1.41 | 1706 | 0.10 | 1.16 |
| Conoco, 25 mm, 1.5% | 1.648 | 6.07 | 1.32 | 1458 | 0.21 | 1.19 |
| Conoco, 25 mm, 3% | 1.620 | 5.85 | 1.40 | 1560 | 0.04 | 1.14 |

EXAMPLE 3

A third graphite electrode trial was conducted with additions of the fibers from Mitsubishi Chemical only (mesophase pitch fibers, 6 mm long chopped bundles), the same fibers as used in U.S. Pat. No. 6,280,663. Addition levels were 2, 4, and 6 weight percent. The stocks were again prepared in the paddle arm, cylinder mixer, cooled, and extruded to 150 mm×330 mm long electrodes. The electrodes were processed as described above. The physical properties of the electrodes with fibers are compared to those of control electrodes (no fibers) below.

TABLE III

Properties of Cylinder Mixed Electrodes With Fiber Additions

|  | Density (g/cm³) | Resistance (μΩm) | Modulus (psi × 10⁶) | Flex Str (psi) | Long CTE (1/° C. × 10⁻⁶) | Trans CTE (1/° C. × 10⁻⁶) |
|---|---|---|---|---|---|---|
| Without Fibers | 1.685 | 5.25 | 1.22 | 1323 | 0.25 | 1.24 |
| Mitsubishi, 6 mm, 2% | 1.692 | 5.07 | 1.44 | 1534 | 0.11 | 1.21 |
| Mitsubishi, 6 mm, 4% | 1.685 | 5.12 | 1.52 | 1676 | 0.06 | 1.24 |
| Mitsubishi, 6 mm, 6% | 1.684 | 5.13 | 1.59 | 1715 | −0.01 | 1.15 |

EXAMPLE 4

A fourth graphite electrode trial was conducted with additions of the fibers from Mitsubishi Chemical (mesophase pitch fibers, 6 mm and 25 mm long chopped bundles). Addition level was 5%. The stocks were prepared in the Sigma mixer, cooled, and extruded to 150 mm×330 mm long electrodes. The filler size (coke powder and iron oxide) was either standard or fine (coke powder 55% finder than 74 microns or 90% finer than 74 microns, iron oxide 5 microns rather than 74 microns, extra coke fines (1-10 microns) added to the batch). Also, some of the batches were prepared with the fibers added after 50 minutes of the 70 minute heating/mixing cycle rather than at the beginning. The electrodes were processed as described above. The physical properties of the electrodes with fibers are compared to those of control electrodes (no fibers, either standard size or fine filler) below.

TABLE IV

Properties of Sigma Mixed Electrodes With Fine Fillers and Fiber Additions

|  | filler & oxide sizing | fiber charging time | Dens. (g/cm3) | Resist. (uhm) | Flex Str (psi) | Long. CTE (/C. × 10−6) | Trans. CTE (/C. × 10−6) | Britt. (kN/mm) | Tough (mm) |
|---|---|---|---|---|---|---|---|---|---|
| Control, 0", .0% | std | none | 1.608 | 6.28 | 925 | 0.116 | 1.060 | 3.02 | 0.79 |
| Fine Filler, 0", .0% | fine | none | 1.582 | 7.13 | 732 | 0.075 | 0.940 | 1.79 | 1.12 |
| Fibers & Fine Filler, 0.25", 5% | fine | initial | 1.553 | 6.11 | 1154 | −0.296 | 0.782 | 6.11 | 0.66 |
| Fibers & Fine Filler, 0.25", 5% | fine | 50 min | 1.545 | 6.27 | 1134 | −0.370 | 0.744 | 4.16 | 0.94 |
| Fibers & Fine Filler, 1", 5% | fine | initial | 1.588 | 5.60 | 1261 | −0.292 | 0.839 | 6.51 | 0.57 |
| Fibers & Fine Filler, 1", 5% | fine | 50 min | 1.562 | 6.16 | 1146 | −0.472 | 0.635 | 2.30 | 1.57 |

The disclosures of all cited patents and publications referred to in this application are incorporated herein by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A process for preparing a graphite article, the process comprising
    (a) mixing (i) a particulate fraction comprising at least about 35 weight percent coke, coal or mixtures thereof having a diameter such that a major fraction passes through a 25 mm mesh screen but not a 0.25 mm mesh screen, (ii) a pitch binder and (iii) carbon fibers, to form a stock blend;
    (b) extruding the stock blend to form a green stock;
    (c) baking the green stock to form a carbonized stock; and
    (d) graphitizing the carbonized stock by maintaining the carbonized stock at a temperature of at least about 2500° C.,
    wherein the fibers are added to the particulate fraction and pitch binder after at least about 15% of the mix cycle is completed.

2. The process of claim 1 wherein the fibers have an average length of no more than about 32 mm.

3. The process of claim 1 wherein the fibers are added to the particulate fraction and pitch binder after at least about 50% of the mix cycle is completed.

4. The process of claim 1 wherein the carbon fibers are present at a level of about 0.5 to about 6 parts by weight of carbon fibers per 100 parts by weight of calcined coke.

5. The process of claim 4 wherein the carbon fibers have a tensile strength of at least about 150,000 psi.

6. The process of claim 4 wherein the carbon fibers have a Young's modulus of about $15 \times 10^6$ psi.

7. The process of claim 4 wherein the carbon fibers have an average diameter of about 6 microns to about 15 microns.

8. The process of claim 1 wherein the particulate fraction comprises materials selected from the group consisting of calcined coke, petroleum coke, coal derived coke, calcined anthracite coal or mixtures thereof.

9. The process of claim 1 wherein the particulate fraction comprises up to about 65% of a filler comprising at least about 75% coke having a diameter such that at least about 70% will pass through a 200 Tyler mesh screen.

10. The process of claim 9 wherein the coke in the filler has a diameter such that at least about 90% will pass through a 200 Tyler mesh screen.

11. The process of claim 9 wherein the filler comprises between about 0.5% and about 25% of additives.

12. The process of claim 11 wherein the additives comprise iron oxide having an average particle diameter such that they are smaller than about 10 microns, petroleum coke having an average particle diameter such that they are smaller than about 10 microns, and combinations thereof.

13. The process of claim 1 wherein the particulate fraction comprises at least about 50 weight percent coke, coal or mixtures thereof having a diameter such that a major fraction passes through a 25 mm mesh screen but not a 0.25 mm mesh screen.

* * * * *